United States Patent
Ima

(10) Patent No.: US 6,634,446 B2
(45) Date of Patent: Oct. 21, 2003

(54) MULTI-WHEEL-DRIVE VEHICLE WITH A FRONT TRANSAXLE DEVICE

(75) Inventor: Akihiro Ima, Amagasaki (JP)

(73) Assignee: Kanzaki Kokyukoki Mfg. Co., Ltd. (JP)

(*) Notice: Subject to any disclaimer, the term of this patent is extended or adjusted under 35 U.S.C. 154(b) by 18 days.

(21) Appl. No.: 09/876,092

(22) Filed: Jun. 8, 2001

(65) Prior Publication Data

US 2001/0050188 A1 Dec. 13, 2001

(30) Foreign Application Priority Data

Jun. 8, 2000 (JP) .................................... 2000-172151

(51) Int. Cl.[7] .................. B60K 17/34; B60K 23/08; B60K 41/24; B62D 61/10
(52) U.S. Cl. ............... 180/24.1; 180/24.08; 180/24; 180/244; 180/247; 192/13 R
(58) Field of Search .................. 180/24.08, 24.09, 180/24.1, 23, 24, 244, 247, 248, 338, 370, 900; 192/13 R

(56) References Cited

U.S. PATENT DOCUMENTS 3,773,130 A * 11/1973 Mueller .................. 180/24.09
4,466,519 A * 8/1984 Römer .................... 180/244
4,671,377 A * 6/1987 Ehrlinger et al. ........... 180/248
5,248,020 A * 9/1993 Kreitzberg ................ 180/244

FOREIGN PATENT DOCUMENTS

JP 63-247172 * 10/1988

* cited by examiner

Primary Examiner—Peter C. English
(74) Attorney, Agent, or Firm—Sterne, Kessler, Goldstein & Fox P.L.L.C.

(57) ABSTRACT

A multi-wheel-drive vehicle has at least six wheels, a transmission with a first brake, and a transaxle device for the front drive wheels. The transaxle device includes a drive axle, an input shaft perpendicular to the drive axle for receiving power from the transmission, a drive train connecting the drive axle to the input shaft, a second brake, and a clutch device on the input shaft. The transaxle device may include a pair of drive axles connected by a differential unit. The clutch device can selectively isolate the drive axles from the rotation of the input shaft. Further, the clutch device is engaged when the first brake is applied. Additionally, the first and second brakes may be connected such that their operation may be synchronized.

4 Claims, 11 Drawing Sheets

MULTI-WHEEL-DRIVE VEHICLE WITH A FRONT TRANSAXLE DEVICE

BACKGROUND OF THE INVENTION

1. Field of the Invention

The present invention relates to a front transaxle device of a multi-wheel-drive vehicle.

2. Background Art

Conventionally, a multi-wheel-drive vehicle wherein four or more wheels are driven is known.

In this multi-wheel-drive vehicle, transaxle devices for supporting axles are disposed corresponding to the positions of the axles. For example, a rear transaxle device for supporting rear axles is disposed at a rear portion of the vehicle, and a front transaxle device for supporting front axles is disposed at a front portion of the vehicle. In a structure where six or more wheels are driven, a middle transaxle device for supporting middle axles is disposed at a longitudinally intermediate portion of the vehicle.

Furthermore, a transmission which transmits the power from a prime mover (e.g., an engine) is provided. By transmitting the power from the transmission to each of the transaxle devices, the wheels are driven through each of the axles.

In comparison with a two-wheel-drive structure, the above-mentioned multi-wheel-drive structure is more useful in that its driving performance over a bad road is good, and plenty of power is available for climbing a hill. Thus, this structure has come to be widely adopted by various kinds of vehicles such as automobiles, agricultural trucks, and the like.

Now, further improvement of such a multi-wheel-drive vehicle in terms of its driving performance over bad roads, cost-saving, maintainability, etc., is increasingly desired given the increasing popularity of such vehicles.

BRIEF SUMMARY OF THE INVENTION

An object of the invention is to provide a front transaxle device which gives improved braking performance to a multi-wheel-drive vehicle so as to improve further the driving performance of the vehicle over bad roads. Another object of the invention is to provide the front transaxle device with a simple structure so as to reduce manufacturing costs and enhance the maintainability thereof.

According to the present invention, a front transaxle device provided to a multi-wheel-drive vehicle comprises an input shaft for receiving power, a pair of left and right front axles supported in the front transaxle device, a differential connecting the left and right front axles in a differential manner, a pinion shaft, a clutch device which engages the pinion shaft with and disengages the pinion shaft from the input shaft, a rotary object interposed between the differential and the pinion shaft, and a brake device which brakes the rotary object. Therefore, the braking performance is improved and the vehicle's braking distance can be shortened. Thus, a multi-wheel-drive vehicle, which can run smoothly on a bad road and enhance fuel economy, may be available. Furthermore, by operating the clutch device, it is easy to select between the mode wherein the power is transmitted to the front wheels supported by the front transaxle device and the mode wherein the power is not transmitted to the front wheels. Thus, by linking the clutch device with operating means, a vehicle which can be put between 4-wheel-drive mode and 6-wheel-drive mode (for example) is available. Additionally, because the clutch device is disposed between the input shaft and the pinion shaft and the brake device is disposed at the rotary object, the two devices are separated and can avoid interfering with each other, thereby reducing the complexity of the layout.

The brake device comprises a piston which can be moved hydraulically, friction objects which engage with each other by the force of the piston, and a mechanism which maintains a constant stroke of the piston to engage the friction objects regardless of any abrasive reduction of the friction objects. Therefore, in spite of abrasive reduction of friction objects in the brake device, it is unnecessary to adjust the stroke of the piston to keep a good braking response of the brake device, thereby reducing the need for maintenance.

The rotary object is a middle shaft disposed between the pinion shaft and the differential and supported parallel to a rotational axis of the differential, and the middle shaft is engaged with the differential through a spur gear. Therefore, the parts of the brake device are arranged along and detached from the middle shaft parallel to the rotational axis of the differential. Thus, installation and removal of the brake device is easy, thereby resulting in good maintainability. Furthermore, because the middle shaft is connected with the differential through the spur gear, realignment using a shim and the like, which is necessary in a structure having the middle shaft connected with the differential through bevel gears, is not necessary. Such alignment can be eliminated.

A front transaxle device is provided to a multi-wheel-drive vehicle which has six or more wheels, wherein a pair of foremost wheels of the vehicle are supported and can be driven. A transmission provided to the vehicle is connected with the front transaxle device through a clutch device which is engaged when a brake operating means provided to the vehicle is operated to brake. Therefore, when the brake operating means is operated to its braking position by the linkage between the brake operating means and the clutch device, braking force is also transmitted to the pair of foremost wheels. Thus, the vehicle's braking distance at high speed can be shortened. Additionally, the front transaxle device can be bypassed when the brake device is not being operated, thereby enhancing fuel economy.

Other and further objects, features, and advantages of the invention will appear more fully from the following description.

BRIEF DESCRIPTION OF THE DRAWINGS/FIGURES

DETAILED DESCRIPTION OF THE INVENTION

Figure 1:
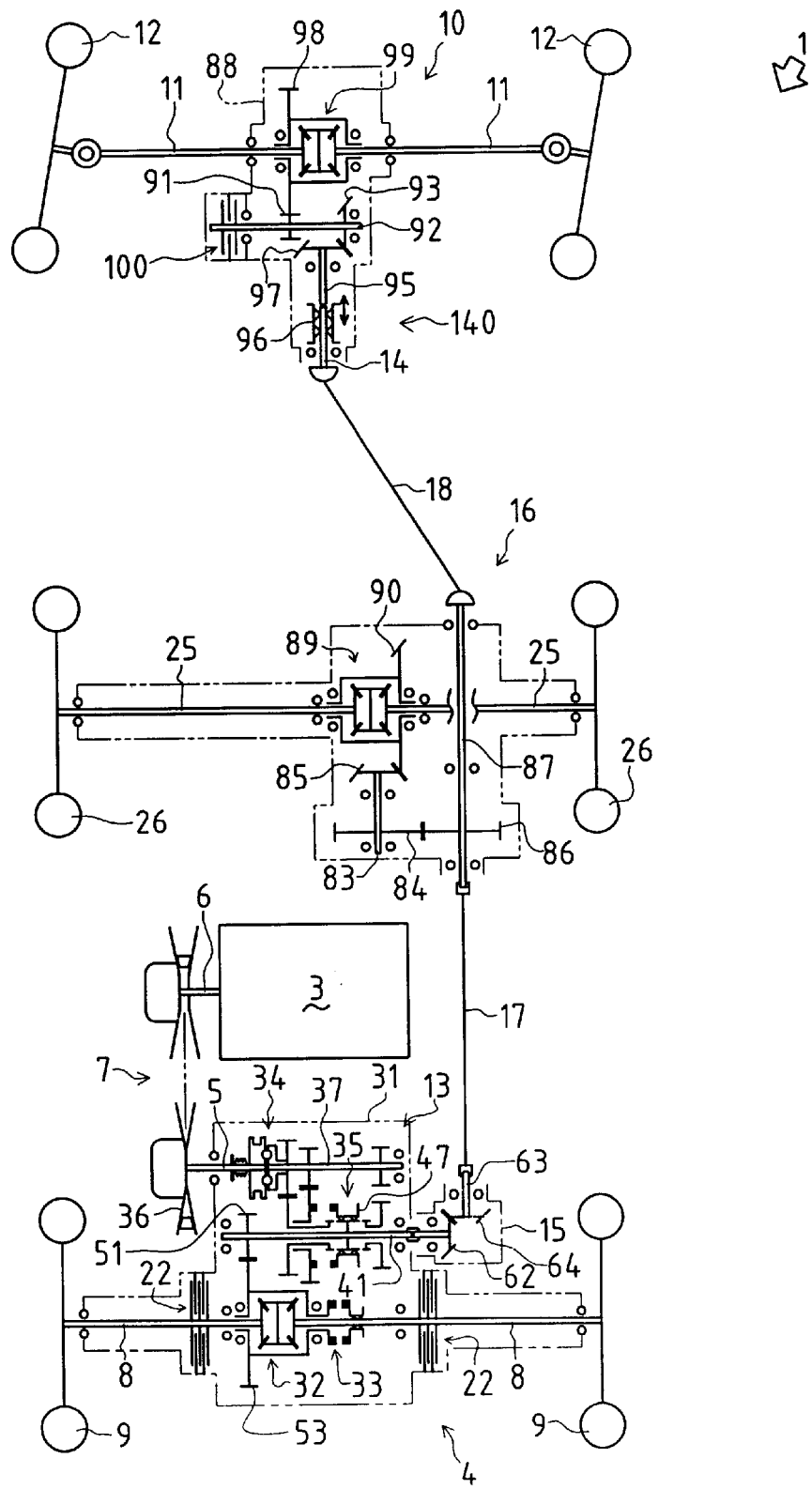
FIG. 1 is a schematic diagram of a driving transmission system of a multi-wheel-drive vehicle including a front transaxle device of the present invention.

Referring to FIG. 1, a multi-wheel-drive vehicle 1 comprises a front transaxle device 10 disposed at its front portion, a middle transaxle device 16 disposed at its longitudinally intermediate portion, and a rear transaxle device 4 disposed at its rear portion. The front transaxle device 10 includes a pair of left and right front axles 11, the middle transaxle device 16 includes a pair of left and right middle axles 25, and the rear transaxle device 4 includes a pair of left and right rear axles 8. Each of above-mentioned front, middle, and rear axles 11, 25 and 8 supports each of front wheels 12, middle wheels 26, and rear wheels 9, respectively, at their outer ends.

A front brake device 100 which serves as a first braking device is provided to the front transaxle device 10, and rear brake devices 22 which serve as a second braking device are provided to the rear transaxle device 4.

The front wheels 12 are steerable, i.e., rotatable leftward and rightward according to manipulation of a steering operating device (not shown).

A transmission 13 is provided in the rear transaxle device 4. The power from an engine 3 installed in the body of the vehicle is transferred to the transmission 13 and changes rotational speed. Then, the power is used to drive the left and right rear wheels 9 through the rear axles 8, and also, it is transferred to the middle transaxle device 16 so as to drive the middle wheels 26 through the middle axles 25. Thus, the vehicle moves forward and backward by the driving of the rear wheels 9 and the middle wheels 26, i.e., in 4-wheel-drive.

Alternatively, the power from the transmission 13 may be transferred to the front wheels 12 so as to drive all six wheels 9, 12 and 26, thereby enabling the vehicle to be put in 6-wheel-drive. This structure will be described later.

A structure of the rear transaxle device 4 will now be described.

The rear transaxle device 4 comprises a rear axle housing 31 which houses the transmission 13 together with the rear axles 8. An input shaft 5 of the transmission 13 is connected to an output shaft 6 of the engine 3 through a belt-type automatically continuous variable transmission (hereafter "CVT") 7 comprising split pulleys and a belt.

The transmission 13 comprises a torque sensor 34 and a speed-changing gear mechanism 35. The torque sensor 34 detects torque, which is applied on the wheels as load, and translates the torque into an output signal. The speed-changing gear mechanism 35 is operated by manipulating a speed-changing operating device like a lever or a pedal (not shown) disposed outside the rear axle housing 31.

The rear axle housing 31 also houses a differential 32 interposed between the speed-changing gear mechanism 35 and the pair of left and right rear axles 8. The differential 32 connects the left and right rear axles 8 differentially with each other. The differential 32 is provided with a differential locking mechanism 33 in the rear axle housing 31. The differential locking mechanism 33 is linked with a differential-locking device like a lever or a pedal (not shown) disposed outside the rear axle housing 31 so as to lock the differential 32. A power take-off casing 15 is fixed on a side portion of the rear axle housing 31. The power take-off casing 15 is provided therein with a power output section from which power is transferred to the middle transaxle device 16 and the front transaxle device 10.

The above-mentioned input shaft 5 is supported laterally in the rear axle housing 31 and projects outwardly from either the left or right sides thereof. A follower split pulley 36 is provided on the outwardly projecting portion of the input shaft 5, which serves as an input section receiving the power from the engine 3. The output part of the CVT 7 is formed by this follower pulley 36. The CVT 7 is normally formed such that the speed reduction ratio is automatically steplessly reduced according to the increase of rotary speed of the engine 3.

In the rear axle housing 31, a main shaft 37 is provided coaxially with the input shaft 5. The main shaft 37 and the input shaft 5 are connected with each other through above-mentioned torque sensor 34. The torque sensor 34 detects various type resistances such as rolling resistance, air resistance, acceleration resistance, and grade resistance generated from each of the driven wheels, and outputs detection signals into a controller (not shown). The controller adjusts the degree of opening of a throttle valve of the engine 3 corresponding to the detection signals, thereby serving as a torque sensing governor.

In the rear axle housing 31, a counter shaft 41 is disposed parallel to the main shaft 37. The speed-changing gear mechanism 35 is provided between both shafts 37 and 41.

The speed-changing gear mechanism 35 comprises a plurality of (in this embodiment, two) drive gears fixed on the main shaft 37 to rotate together with the main shaft 37, and a plurality of (in this embodiment, two) transmission gears supported rotatably on the counter shaft 41 to engage with the respective drive gears on the main shaft 37, thereby providing various (in this embodiment, two, i.e., high and low) gear ratios. In order to reverse the rotational direction of the counter shaft 41 while the main shaft 37 is rotated in a fixed direction, the speed-changing gear mechanism 35 also comprises a driving reverse gear fixed on the main shaft 37, a reverse gear supported rotatably on the counter shaft 41, and an idle gear through which both the reverse gears on the shafts 37 and 41 engage with each other.

A gear-changing clutch slider 47 is axially slidably but not relatively rotatably fitted onto the counter shaft 41 through a spline. By sliding the gear-changing clutch slider 47, one gear is selected from among the two transmission gears and the reverse gear on the counter shaft 41 to engage with the counter shaft 41 through the gear-changing clutch slider 47. This selection brings the counter shaft 41 into a high-speed regularly directed rotation, a low-speed regularly directed rotation, or a reversely directed rotation depending upon which gear is chosen. Also, the gear-changing clutch slider 47 can be located at its neutral position where it engages with none of the gears. The gear-changing clutch slider 47 is linked with the above-mentioned speed-changing device (not shown).

The counter shaft 41 is fixedly provided thereon with an output gear 51 adjacent to one of its ends, thereby transmitting the rotation of the counter shaft 41 to the above-mentioned differential 32.

The differential 32 generally uses bevel gears to connect the left and right rear axles 8 in a differential manner. An input gear 53 is disposed on a differential casing, which houses the bevel gears, so as to engage with the output gear 51. The differential locking mechanism 33 is disposed around one of the axles 8 so as to engage the differential casing with and disengage the differential casing from the axle 8 according to operation of the differential locking lever (not shown). When the differential casing engages with the axle 8, both the axles 8 are locked together, i.e., the differential 32 is locked.

The rear brake devices 22 are provided respectively on the pair of left and right rear axles 8 so as to apply brake force onto both rear axles 8 according to the operation of a later-discussed brake pedal.

One end of the counter shaft 41 extends toward one of the left or right sides into the power take-off case 15, and a bevel gear 62 is fixed onto its end portion. An output shaft 63 is supported in the longitudinal direction of the vehicle and perpendicularly to the counter shaft 41 in the power take-off case 15. A bevel gear 64 is fixed onto the output shaft 63 and engages with the bevel gear 62.

The output shaft 63 projects forward from the power take-offcase 15, and connects to a transmission shaft 87 of the middle transaxle device 16 through a drive shaft 17.

Next, the middle transaxle device 16 will be described.

The transmission shaft 87 is supported in the longitudinal direction of the vehicle, and its rear end projects rearward so as to receive driving force from the rear transaxle device 4. The transmission shaft 87 also projects forward from the middle transaxle device 16, thereby forming an output section for the front transaxle device 10.

A middle-axle drive gear 86 is fixed onto the transmission shaft 87, and a middle shaft 83 is rotatably supported parallel to the transmission shaft 87. An intervention gear 84 is fixed onto one end of the middle shaft 83 so as to engage with the middle-axle drive gear 86, and a bevel gear 85 is provided onto the other end of the middle shaft 83. The bevel gear 85 engages with an input bevel gear 90 of a differential 89 which differentially connects the left and right middle axles 25 with each other.

Figure 2:
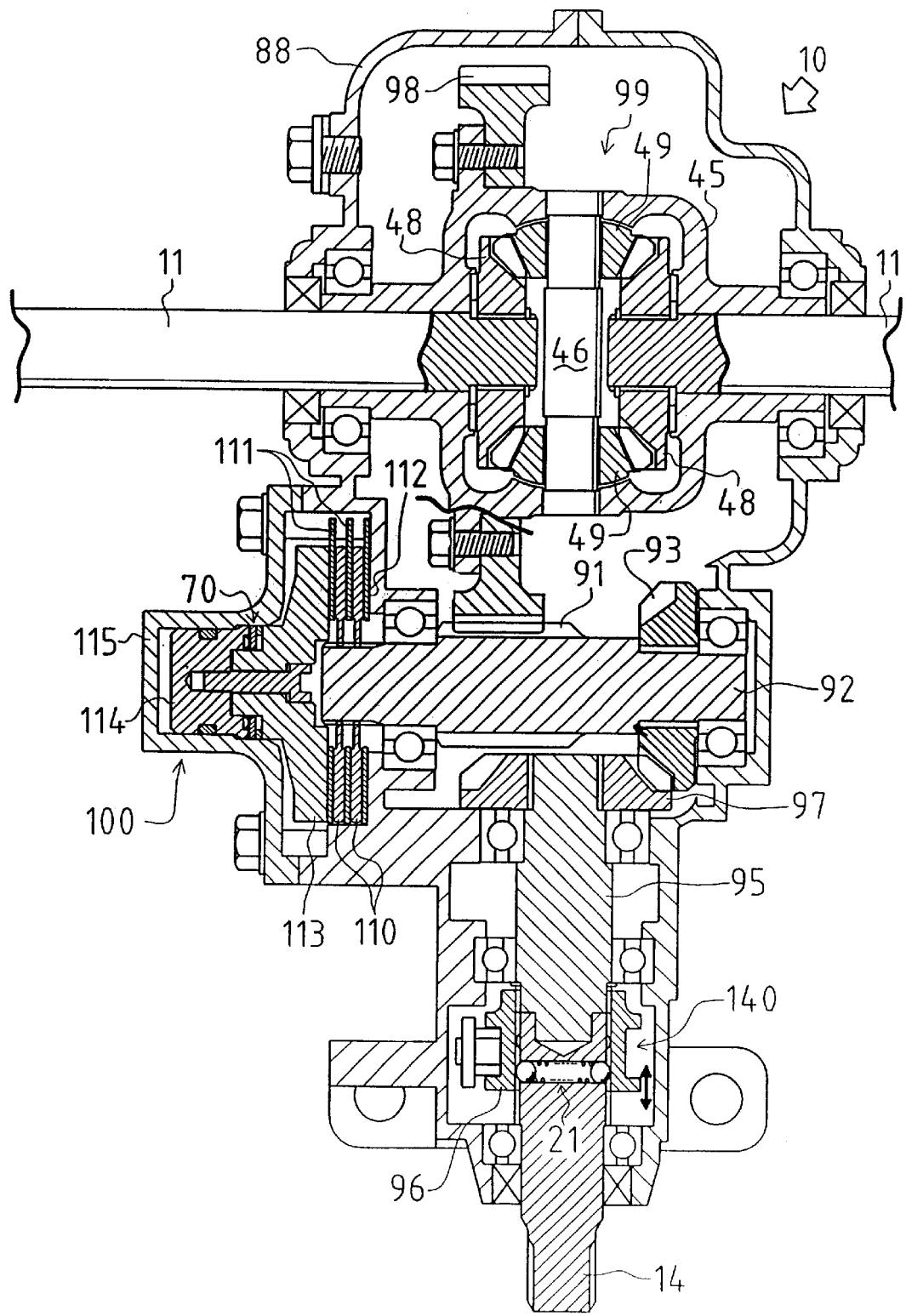
FIG. 2 is a horizontally sectional view of the front transaxle device.

Next, the structure of the front transaxle device 10 will be described in accordance with FIGS. 1 and 2.

In the front transaxle device 10, an input shaft 14 is rotatably supported by a housing 88, and connects with the transmission shaft 87 of the middle transaxle device 16 through a propeller shaft 18, universal joints, and the like.

In the housing 88, a pinion shaft 95 is disposed forward of the input shaft 14 and supported coaxially with the input shaft 14. A bevel gear 97 is fixed onto one end portion of the pinion shaft 95. The input shaft 14 is notched on its periphery so as to form splines, and a front clutch slider 96 is axially slidably but not relatively rotatably disposed around the splines. The pinion shaft 95 is also notched on its periphery so as to form splines, thereby being engaged with or disengaged from the front clutch slider 96. A detent mechanism 21 is formed in the input shaft 14 to define positions of the front clutch slider 96, i.e., an engage position where the front clutch slider 96 engages with the pinion shaft 95, and a disengage position where the front clutch slider 96 disengages from the pinion shaft 95.

This clutch device 140 is interlocked with a later-discussed drive mode changing lever 130 through a linkage.

In the housing 88 of the front transaxle device 10, a differential 99 is provided onto the left and right front axles 11 so as to differentially connect the front axles 11 with each other. The differential 99 is constructed similarly to the differential 89 of the middle transaxle device 16. As shown in FIG. 2, the differential 99 comprises a hollow differential casing 45, a pinion shaft 46, pinions 49, and differential side gears 48. The differential casing 45 is disposed coaxially with the front axles 11 and rotatably supported by the housing 88. The pinion shaft 46 is disposed in the differential casing 45 so as to be integrally rotatable with the differential casing 45. The pinions 49 are disposed oppositely to each other and rotatably supported on the pinion shaft 46. Each of the differential side gears 48 is fixed onto an inner end of each of the front axles 11 so as to engage with both the pinions 49.

An input gear 98, which is a spur gear to receive driving force for the differential 99, is fixed onto the differential casing 45.

Next, description will be given on a middle shaft 92 serving as a rotary object which intervenes between the differential 99 and the pinion shaft 95.

The middle shaft 92 is disposed parallel to a rotational axis of the differential 99 (that is, a rotational axis of the differential casing 45). A bevel gear 93 is fixed onto the middle shaft 92, and is engaged with a bevel gear 97 fixedly provided on the pinion shaft 95.

The midway portion of the middle shaft 92 is notched on its periphery to form a reduction gear 91 as a spur gear. The reduction gear 91 is engaged with the input gear 98 of the differential 99.

The middle shaft 92 projects outwardly from the housing 88. A brake casing 115 is fixedly provided onto the outside of the housing 88 so as to cover the projecting end portion of the middle shaft 92. A front brake device 100 as a multi-disc type brake is set up around the projecting end portion of the middle shaft 92 between the brake casing 115 and the housing 88.

In the front brake device 100, first friction discs 110 are axially slidably but not relatively rotatably provided onto the middle shaft 92. Second friction discs 111 are slidably but not relatively rotatably engaged with the housing 88 of the front transaxle device 10. Each of the first friction discs 110 and each of the second friction discs 111 are arranged alternately. A pressure member 113 is provided slidably and coaxially to the middle shaft 92 for pressuring the multi-layered friction discs 110 and 111 against a receiving surface 112 formed at an inner wall of the housing 88. A piston 114 is provided integrally with the pressure member 113 through a bolt 116.

The brake casing 115 projects outwardly and coaxially to the middle shaft 92 so as to form a cylindrical portion. The piston 114 is slidably fitted in the cylindrical portion. Hydraulic fluid is to be tightly supplied into a fluid chamber of the cylindrical portion of the brake casing 115 which is formed between an utmost end surface of the cylindrical portion and the piston 114. By the hydraulic pressure of the fluid supplied into the fluid chamber, the piston 114 slides integrally with the pressure member 113 so as to press the friction discs 110 and 111 against one another, thereby braking the middle shaft 92.

Figure 3:
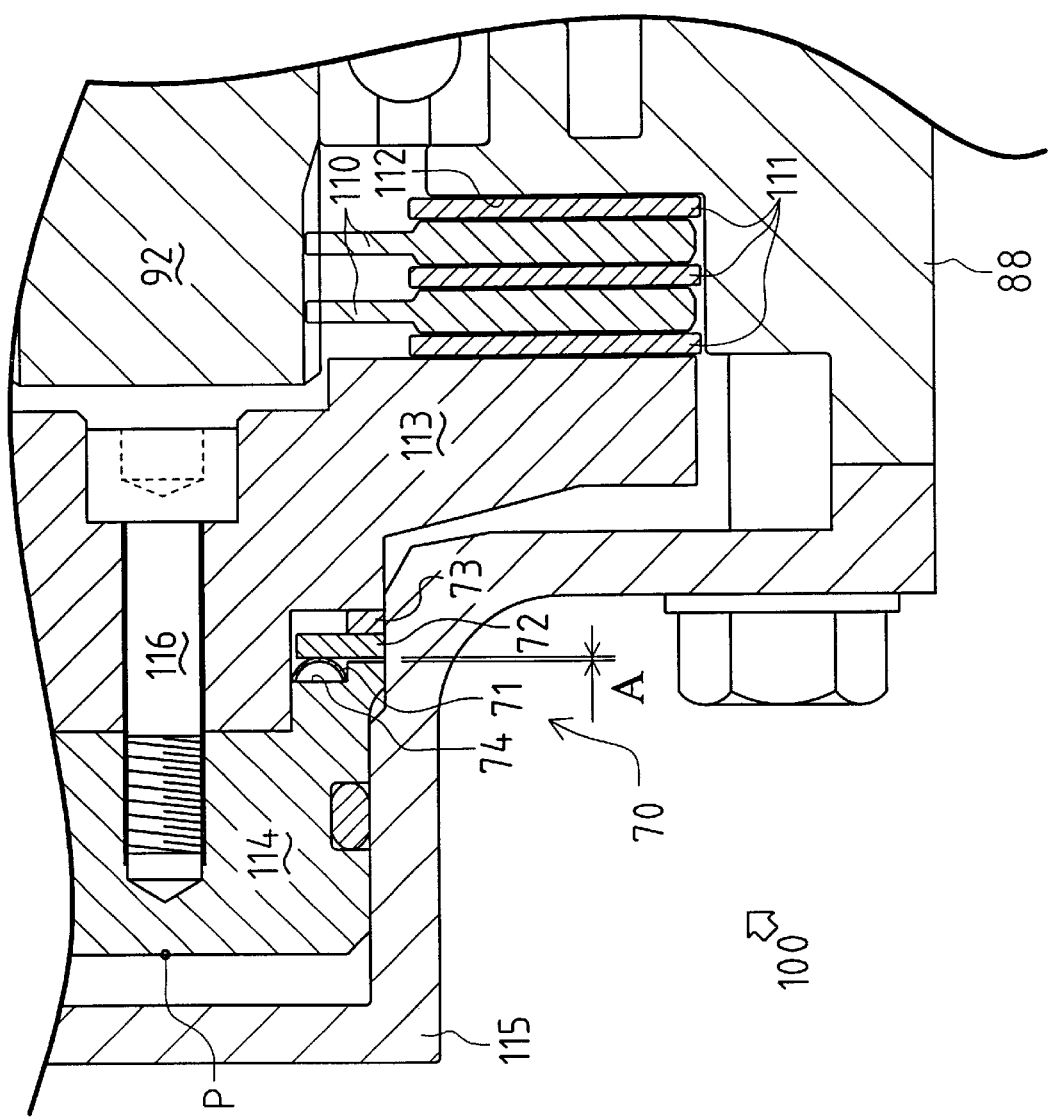
FIG. 3 is an expanded horizontally sectional view of the front transaxle device, showing an automatic gap alignment mechanism, wherein a piston is located at its original brake-released position.

As shown in FIG. 3 and others, there is formed a substantially ring-shaped gap between an end surface of the piston 114 and the pressure member 113 along the inner peripheral surface of the brake casing 115. In the gap are arranged a return spring 71, a collar 72, and a friction ring 73, which constitute an automatic gap alignment mechanism 70 to keep a constant stroke of the piston 114 for the braking operation regardless of abrasive reduction of the friction discs 110 and 111.

The return spring 71 is a ring-shaped spring, which is semicircular in its radial section. The major portion of the spring 71 is inserted into a ring-like groove 74, which is formed on an end surface of the piston 114 around the middle shaft 92 so as to face toward the discs 110 and 111. An apex portion of the spring 71 in its sectionally semicircular shape projects toward the discs 110 and 111 so as to abut against the collar 72. Thus, the spring 71 is sandwiched between the piston 114 and the collar 72. The collar 72 is slidable on the inner peripheral surface of the cylindrical portion of the brake casing 115. The friction ring 73 has outward biasing force in the radial direction and is fitted to an inner peripheral face of the brake casing 115. Therefore, the friction ring 73 is slidable on the inner peripheral surface of the cylindrical portion of the brake casing 115 against frictional resistance between the friction ring 73 and the inner peripheral face of the brake casing 115. This friction resistance applied onto the friction ring 73 is larger than the spring force of the return spring 71 and smaller than the hydraulic pressure applied on the piston 114.

Referring to FIG. 3, the friction discs 110 and 111 are new, i.e., they are not worn. The total clearance between the friction discs 110 and 111 is of a length A. Therefore, a stroke of length A is required for the piston 114 to bring the friction discs 110 and 111 into contact with one another. An original amount of hydraulic fluid is filled in the fluid chamber so that the utmost end of the piston 114 is located at an original brake-released position P. At this time, the return spring 71 expands so as to generate a gap of the length A between the end surface of the piston 114 and the collar 72. The retaining ring 73 is sandwiched between the collar 72 and the pressure member 113.

Figure 4:
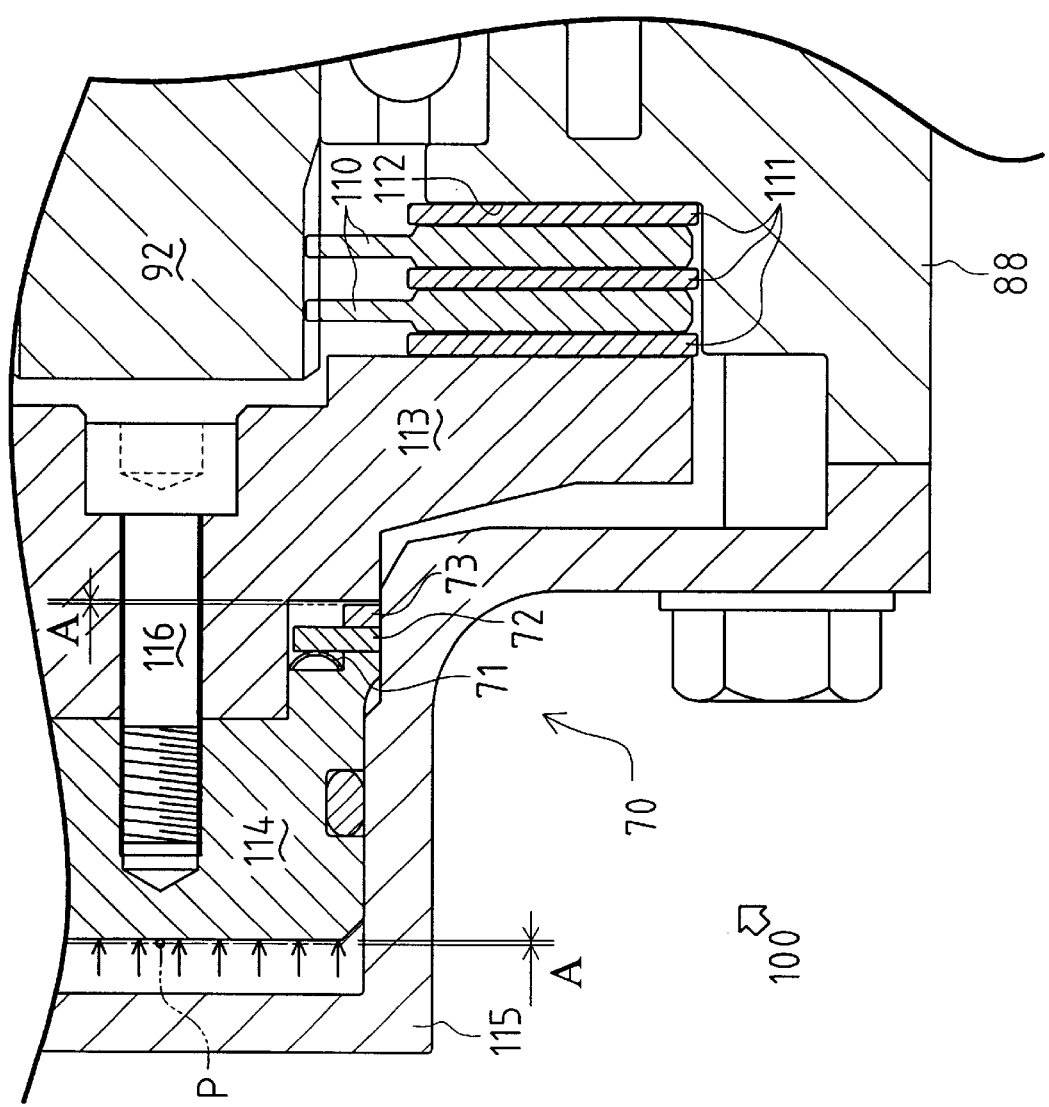
FIG. 4 is a sectional view of the same showing the state that the piston is moved at a stroke of length A from the state shown in FIG. 3, and friction discs are engaged with each other.

For the braking operation of the front brake device 100, hydraulic fluid is supplied into the fluid chamber in the brake casing 115 so as to push the pressure member 113 toward friction discs 110 and 111. As shown in FIG. 4, when the piston 114 is moved at a stroke of length A, the friction discs 110 and 111 are brought into engagement so that the middle shaft 92 starts to be braked. During this stroke of the piston 114, the return spring 71 is compressed between the collar 72 and the piston 114 so as to absorb the pressure force of the piston 114, thereby maintaining the positions of the collar 72 and the friction ring 73. Therefore, the gap of the length A between the piston 114 and the collar 72 is diminished, and a gap of the length A is generated between the friction ring 73 and the pressure member 113.

For releasing the middle shaft 92 from its brake condition shown in FIG. 4, fluid is drained from the fluid chamber in the cylindrical portion of the brake casing 115 so that the spring 71 returns to its expanded condition, thereby locating the piston 114 at the original brake-releasing position P. The pressure member 113 follows the piston 114, thereby disengaging the friction discs 110 and 111. Consequently, the front brake device 100 returns to the state as shown in FIG. 3.

Description will be given on the action of the automatic gap alignment mechanism 70 corresponding to the abrasive reduction of the friction discs 110 and 111 in accordance with FIGS. 5 to 7.

Figure 5:
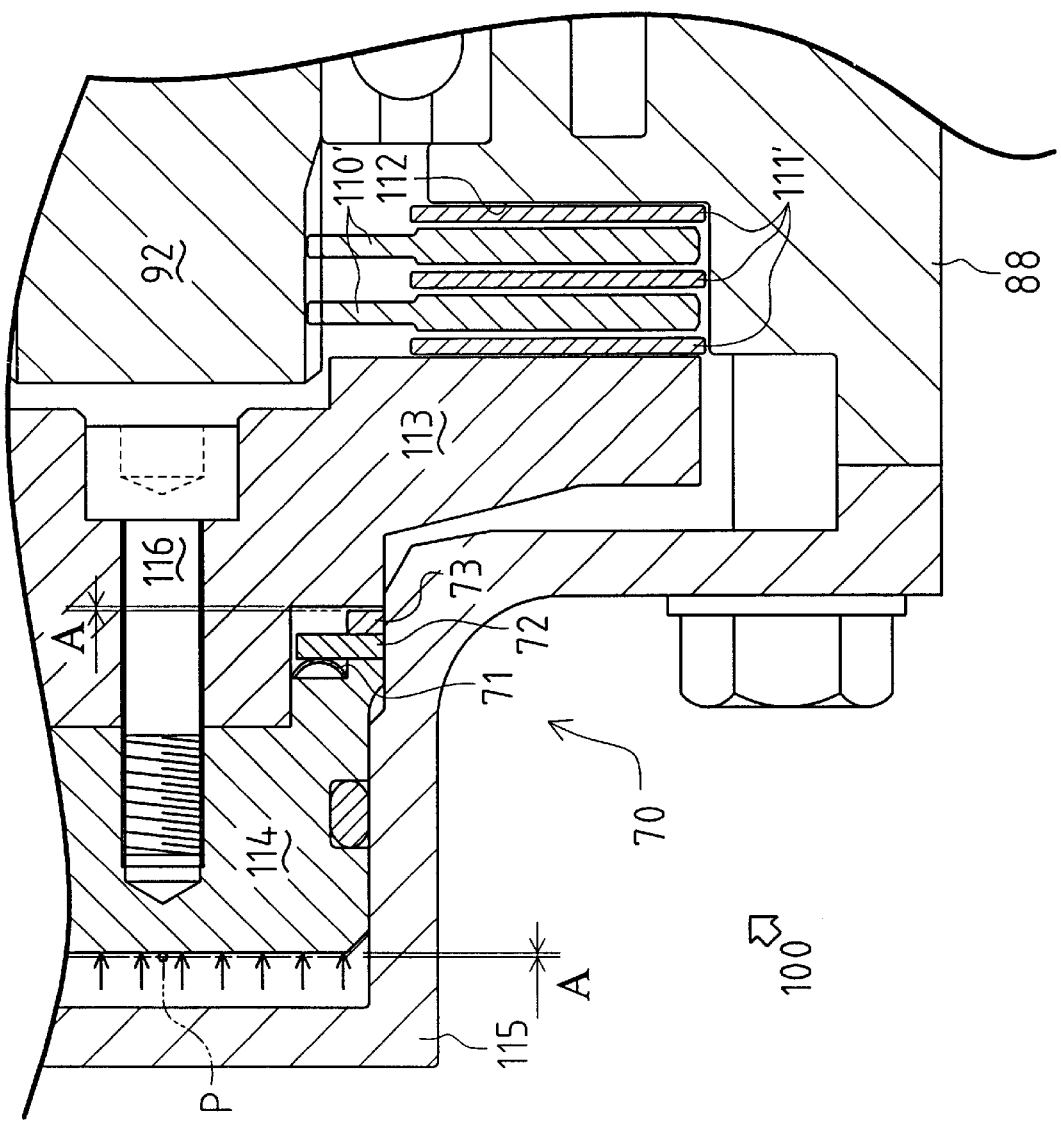
FIG. 5 is a sectional view of the same showing the state that the piston is moved at a stroke of length A from its original brake-released position when the friction discs are worn away.
Figure 6:
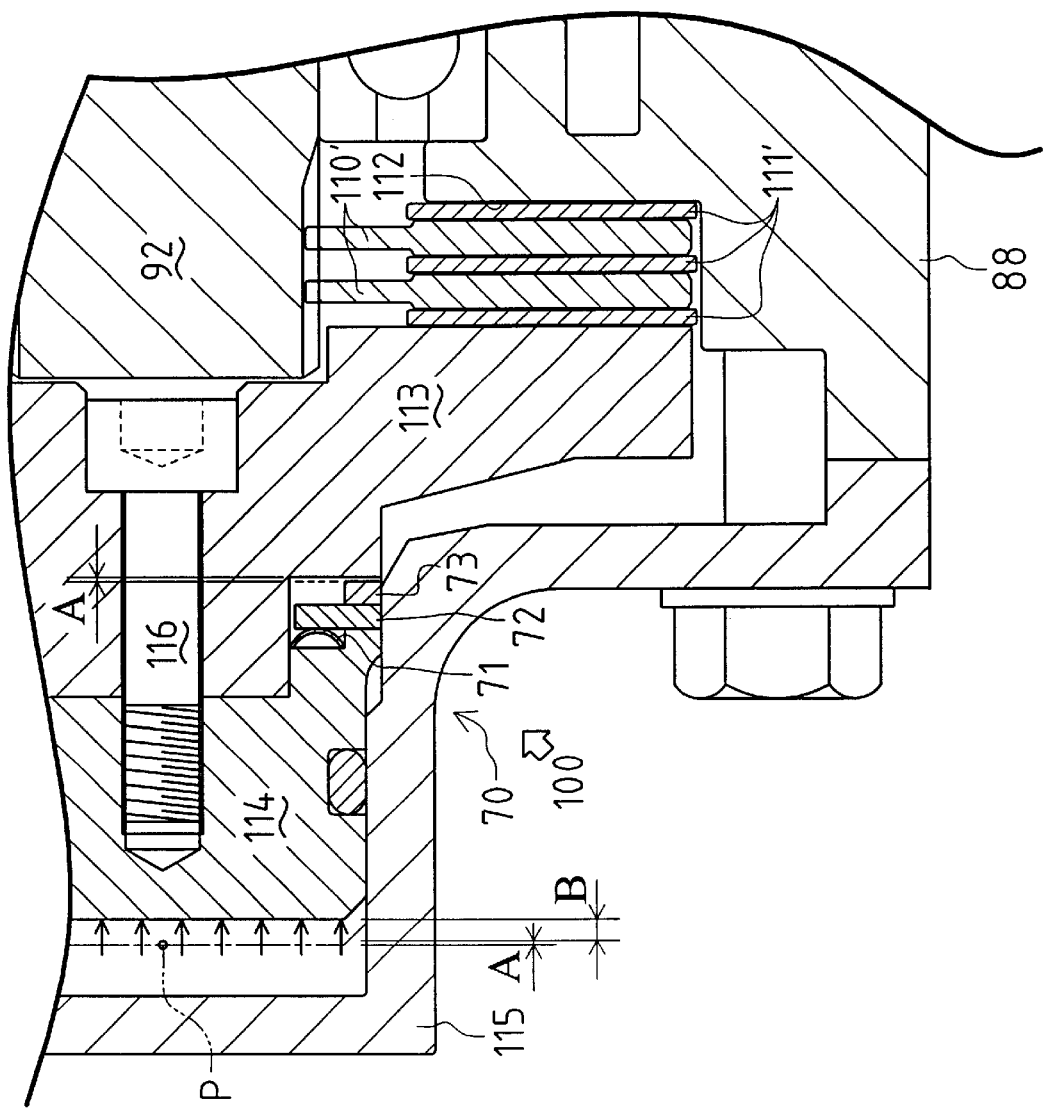
FIG. 6 is a sectional view of the same showing the state that the piston is moved at a stroke of length B from the state shown in FIG. 5, and the friction discs are engaged with each other.

Referring to FIG. 5, friction discs 110' and 111' are abraded versions of friction discs 10 and 111. The total abrasive reduction of the discs 110' and 111' in the axial direction of the middle shaft 92 is of a length B. Therefore, even if the same amount of fluid as that in the situation of FIG. 4 is supplied so as to move the piston 114 at a stroke of length A from its original brake-released position P, the friction discs 110' and 111' are still disengaged. To bring the discs 110' and 111' into engagement, the piston 114 requires an additional stroke of length B. In other words, the piston 114 at the original brake-released position P requires a stroke of lengths A+B for braking.

However, in the situation as shown in FIG. 5, the pressure member 113 is allowed to further move because of the additional clearance among the friction discs 110' and 111' generated by their abrasion. Also, the collar 72 abuts against the end surface of the piston 114 because of the compression of the spring 71. Therefore, as shown in FIG. 6, increased fluid is supplied so that the piston 114 is completely moved together with the pressure member 113 at the stroke of length A+B from its original brake-released position P. During the movement of the piston 114 and the pressure member 113, the end surface of the piston 114 pushes the collar 72 together with the friction ring 73 against the friction resistance between the friction ring 73 and the brake casing 115. Therefore, the collar 72 and the friction ring 73 are shifted from their original positions as shown in FIGS. 3 and 4.

Figure 7:
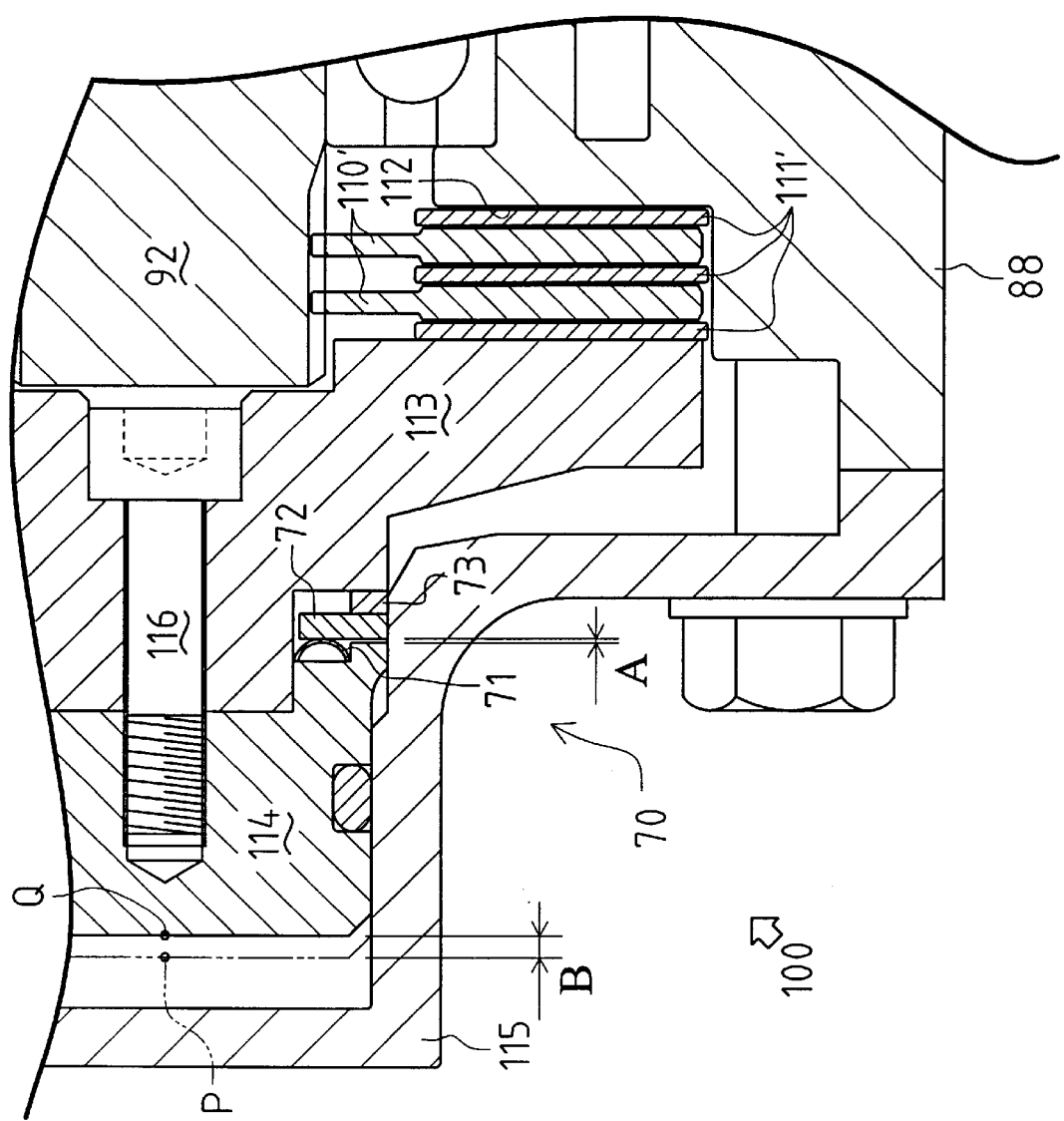
FIG. 7 is a sectional view of the same showing the state that the piston is returned at a stroke of length A from the state shown in FIG. 6 to its new brakeleased released position.

Referring to FIG. 7, when the hydraulic pressure on the piston 114 is released, the friction ring 73 remains at its new position shifted from its original position by its frictional resistance and the spring 71 expands between the collar 72 and the piston 114. Therefore, the piston 114 retreats only a stroke of length A by the expansion of the spring 71. The pressure member 113 follows the retreating of the piston 114, thereby disengaging the friction discs 110' and 111'. Consequently, a new brake-released position Q of the utmost end of the piston 114 is shifted from its original brake-release position P. The required stroke of the piston 114 in addition to the stroke of length A in the next braking operation of the front brake device 100 is just as much as the new abrasive reduction of the discs 110 and 111.

Thus, on every braking action of the piston 114, the friction ring 73 is shifted so as to counter the additional clearance caused by the abrasion of the friction discs 110' and 111', thereby shifting the brake-release position of the piston 114 toward the discs 110' and 111'. Strictly speaking, the required stroke of the piston 114 in every braking operation is of the length A+B. However, in each braking operation, the additional stroke of length B as much corresponding to the abrasive reduction of the friction discs 110' and 111' is extremely small, thereby being able to be ignored in measurement. Therefore, it may be said that the stroke of the piston 114 required for every braking operation is substantially of the length A. In this meaning, the stroke of the piston 114 required for braking is kept constant regardless of the abrasive reduction of the friction discs 110' and 111'. Consequently, the swift response of the front brake device 100 can be maintained for a long period of use.

Figure 8:
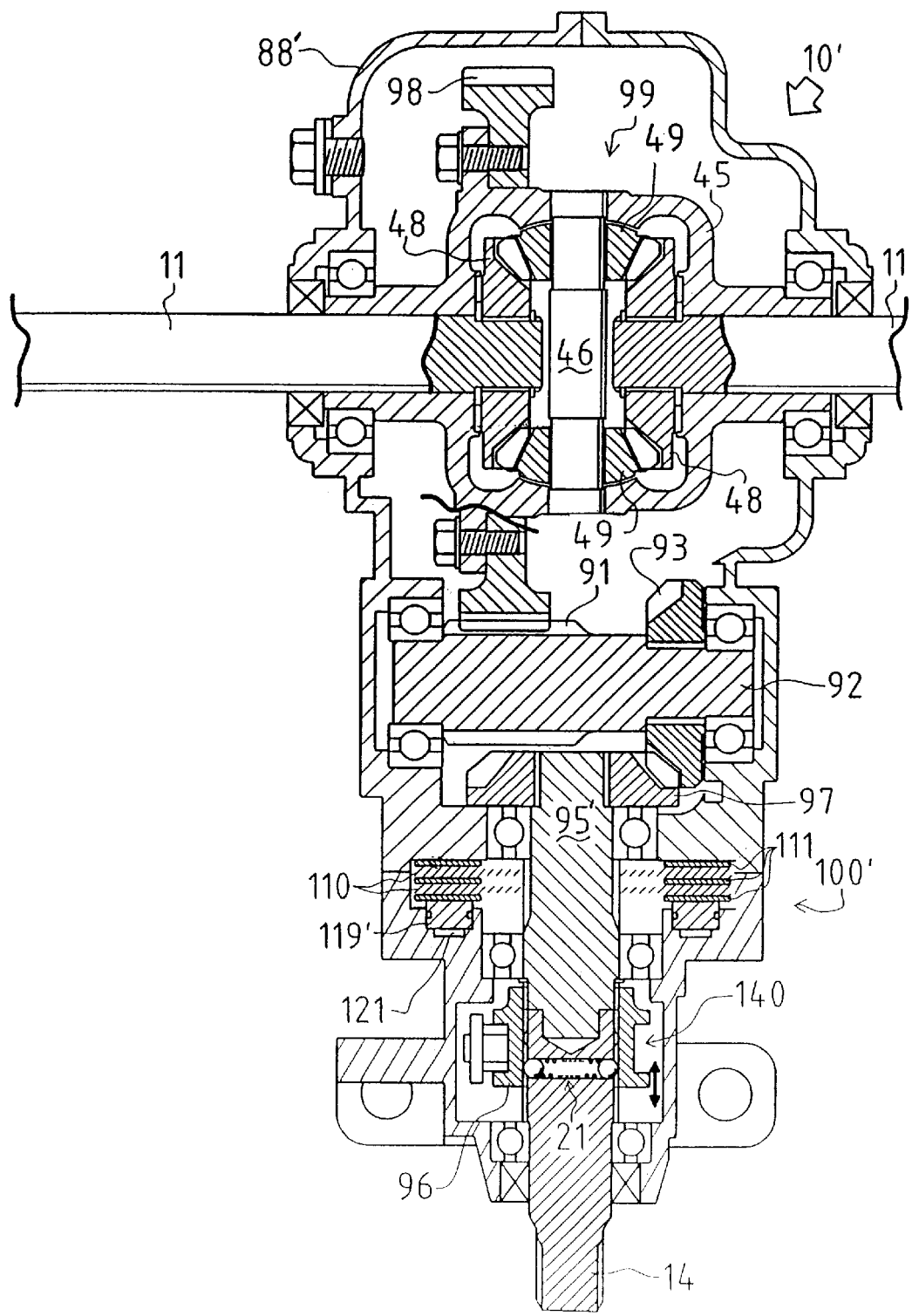
FIG. 8 is a horizontally sectional view of a modification of the front transaxle device wherein the brake device is disposed onto a pinion shaft.

Referring to FIG. 8, in the front transaxle device 10', a brake device 100' is disposed at the pinion shaft 95', instead of the front brake device 100 disposed at the middle shaft 92. Description will be given on this structure.

In the brake device 100', first friction discs 110 are fit onto the pinion shaft 95' such that the first friction discs 110 cannot rotate with respect to the pinion shaft 95'. Second friction discs 111 are engaged with the housing 88'. Each of the first friction discs 110 and each of the second friction discs 111 are arranged alternately. The piston 119' is provided to press the friction discs 110 and 111. The piston 119' is formed into a ring-shape, and is fluid-tightly fitted with a groove formed at an inner wall of the housing 88' such that the piston 119' can be displaced in parallel with the pinion shaft 95'. An oil path 121 is formed at the groove so as to apply hydraulic force onto one end face of the piston 119', thereby operating the piston 119' hydraulically. The oil path 121 is connected to an oil hydraulic circuit 120 which will be described below.

In this structure, the piston 119' is driven by the oil supplied from the oil hydraulic circuit 120 in such a direction as to project and to press the friction discs 110 and 111, thereby braking the pinion shaft 95' by friction.

Next, the structure in the multi-wheel-drive vehicle to operate the front and rear brake devices 100 and 22 for braking by manipulation of the above-mentioned brake pedal will be described in accordance with FIG. 9.

Figure 9:
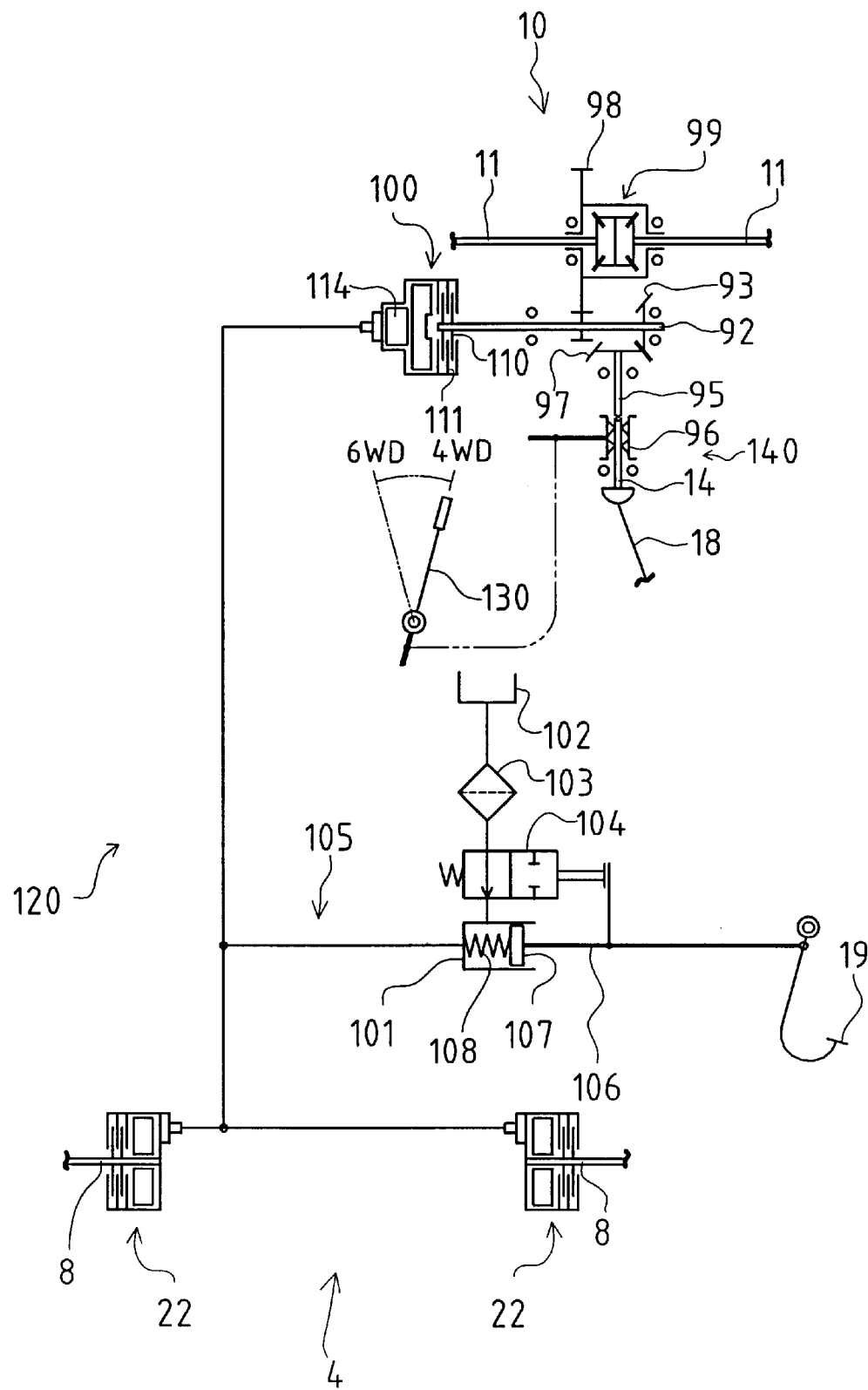
FIG. 9 is a hydraulic circuit diagram of a control system for controlling front and rear brake devices.

The brake pedal 19 constituting the brake operating means in the present embodiment is connected with the rear brake devices 22 and the front brake device 100 through the oil hydraulic circuit 120 shown in FIG. 9. The oil hydraulic circuit 120 comprises a master cylinder 101 to discharge oil for the brake devices 22 and 100, an oil tank 102 for supplying oil to the master cylinder 101, a filter 103 for removing impurities from the oil, an oil path 105 for leading oil from the master cylinder 101 to the front and rear brake devices 100 and 22, and the like.

The brake pedal 19 is supported rotatably, and an end of a rod 106 is connected to the midway portion of the brake pedal 19. The other end of the rod 106 is fixed on a piston 107 disposed in the master cylinder 101. A biasing spring 108, which also serves as a recovering spring for the brake pedal 19, is disposed in the master cylinder 101.

The filter 103 and a manual valve 104 are disposed at a midway portion of the circuit for supplying oil from the oil tank 102 into the master cylinder 101. The manual valve 104 is interlocked with the rod 106 such that the manual valve 104 opens the circuit when the brake pedal 19 is not depressed, and that the manual valve 104 is switched by the rod 106 and shuts the circuit when the brake pedal 19 is depressed thereby preventing oil from back-flowing in the circuit when the rod 106 pushes the piston 107.

In this structure, when an operator depresses the brake pedal 19, the piston 107 is pushed through the rod 106, and the master cylinder 101 discharges the oil.

The discharged oil is led into the oil path 105 and is divided into two branches. The oil in one branch runs to each of the rear brake devices 22, thereby applying braking force onto the rear axles 8. The braking force is transmitted to the middle axles 25 connected to the rear axles 8 through the drive shaft 17 and the like, thereby also braking the middle axles 25. The oil in the other branch is led into the front brake device 100 to make the piston 114 in the front brake device 100 press against friction discs 110 and 111, thereby applying braking force onto the front axles 11 through the middle shaft 92.

Description will be given on the structure in the multi-wheel-drive vehicle to transmit the power from the engine 3 to the wheels 9, 12, and 26.

As shown in FIG. 1, the transmission 13 provided in the rear transaxle device 4 transmits the power from the engine 3 to the rear axles 8 to drive the rear wheels 9, and also transmits the power to the middle transaxle device 16 through the drive shaft 17 to drive the middle wheels 26 through the middle axles 25.

In other words, the power from the transmission 13 branches to the rear axles 8 and the middle axles 25, thereby constantly driving the rear wheels 9 and the middle wheels 26 (four wheels in total).

Furthermore, the power, which is led from the engine 3 into the middle transaxle device 16, drives the input shaft 14 in the front transaxle device 10 constantly through the transmission shaft 18.

The earlier-discussed clutch device 140 is disposed at the input shaft 14. As shown in FIG. 9, the drive mode changing lever 130 is provided at the appropriate portion of the vehicle to operate the clutch device 140, and the drive mode changing lever 130 is shiftable among a 4-wheel-drive position and a 6-wheel-drive position (two positions in total). The drive mode changing lever 130 is linked with the front clutch slider 96 in the clutch device 140 such that the clutch device 140 is engaged when the drive mode changing lever 130 is located at its 6-wheel-drive position (as shown by '6WD' position in FIG. 9) and that the clutch device 140 is disengaged when the drive mode changing lever 130 is located at its 4-wheel-drive position (as shown by '4WD' position in FIG. 9).

Therefore, when the drive mode changing lever 130 is located at its 6-wheel-drive position, the clutch device 140 is engaged to drive the front transaxle device 10 such that the front wheels 12 are driven through the front axles 11. Because the four wheels of the middle wheels 26 and the rear wheels 9 are driven as described above at this time, the vehicle is put into 6-wheel-drive mode and all six wheels are driven.

On the other hand, when the drive mode changing lever 130 is located at its 4-wheel-drive position, the clutch device 140 is disengaged and the power from the transmission 13 is shut off such that the front wheels 12 are not driven. In this case, the vehicle is put into 4-wheel-drive mode and only the middle wheels 26 and the rear wheels 9, four wheels in total, are driven.

The above-mentioned structure is an example and other embodiments may be given. For instance, instead of the structure where an oil hydraulic circuit 120 is used, a structure which will be described below may apply.

Figure 10:
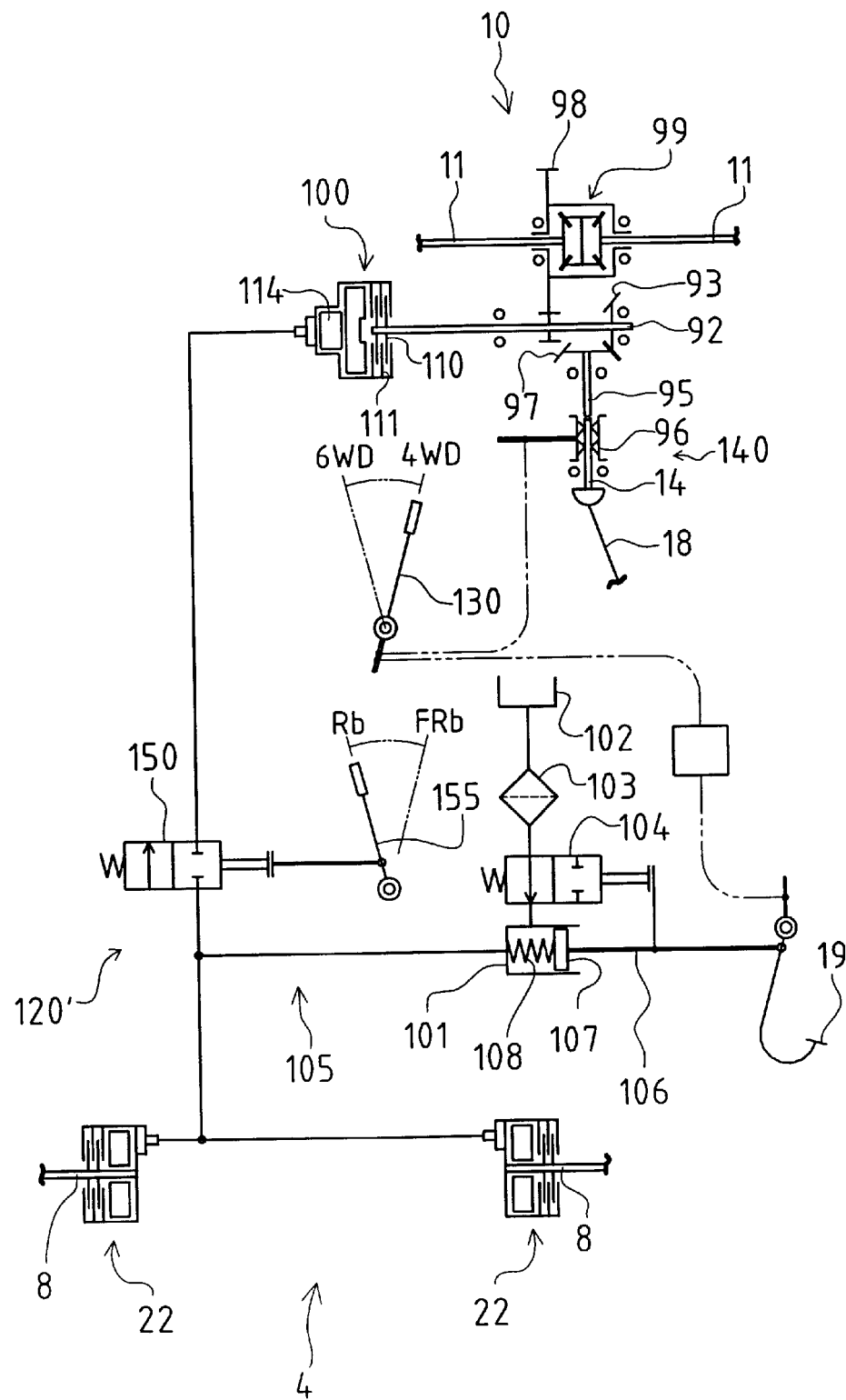
FIG. 10 is a hydraulic circuit diagram of a control system for controlling the front and rear brake devices according to another embodiment.
Figure 11:
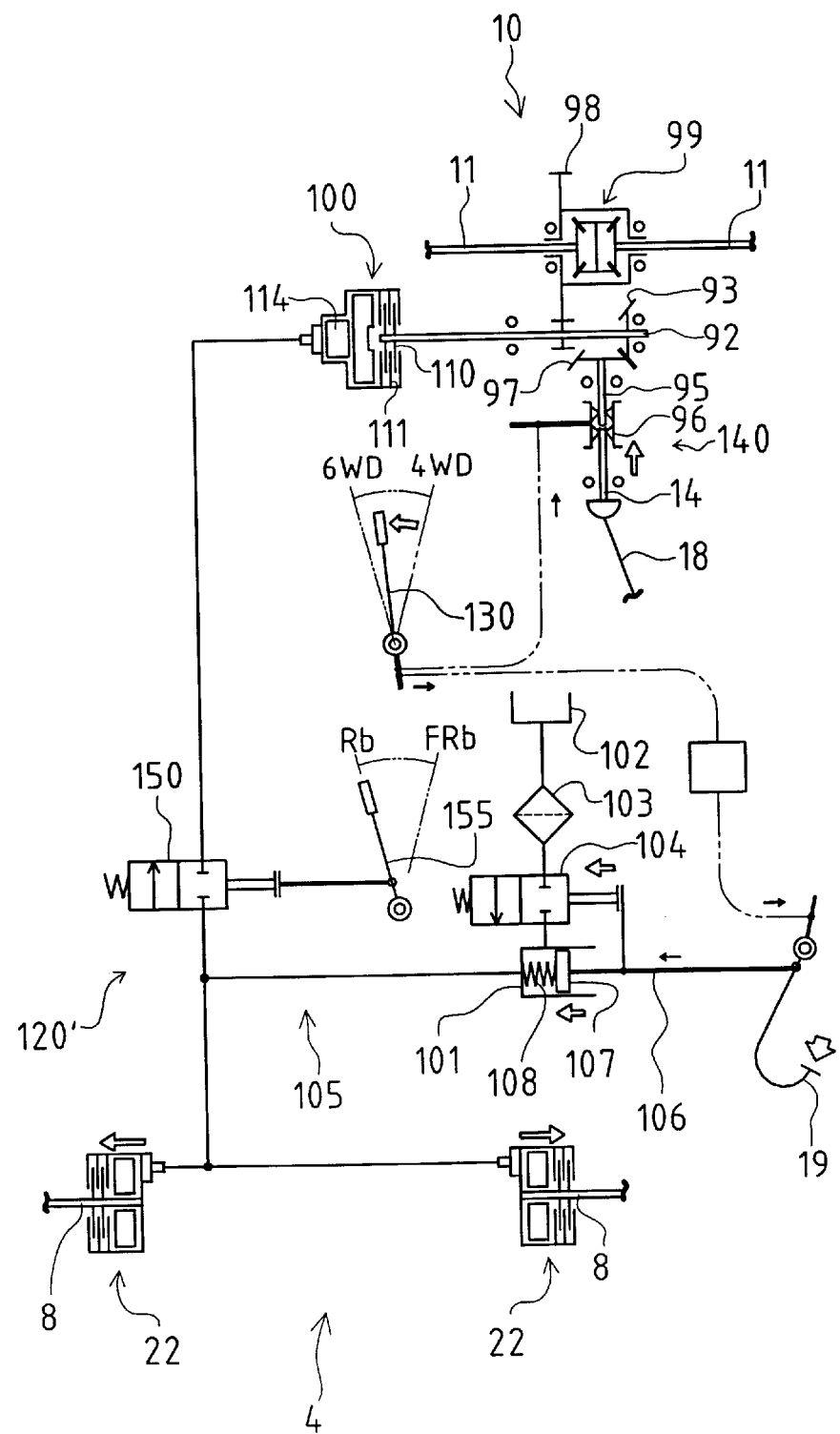
FIG. 11 is a diagram of the embodiment shown in FIG. 10, showing the state that a brake pedal is depressed and a clutch device linked with the brake pedal is engaged.

An oil hydraulic circuit 120' shown in FIG. 10, which is used in this modification, is of the structure that a manual valve 150 which is switchable among two positions is provided at the midway of a path for supplying oil of the master cylinder 101 for the front brake device 100 in the oil hydraulic circuit 120' in the brake system.

A brake mode changing lever 155 serving as a brake mode changing means is provided at the operator's section in the vehicle, and the manual valve 150 is interlocked with the brake mode changing lever 155.

The brake mode changing lever 155 is shiftable according to an operator's manipulation between a front-rear-brake position FRb and a rear-brake position Rb.

When the brake mode changing lever 155 is located at its front-rear-brake position FRb, the manual valve 150 is opened. Thus, when the brake pedal 19 is depressed, oil from the master cylinder 101 is supplied into both the rear brake devices 22 and front brake device 100. In this case, the vehicle is put into front-rear-brake mode wherein the rear and front brake devices 22 and 100 are put into action.

On the other hand, when the brake mode changing lever 155 is located at its rear-brake position Rb, the manual valve 150 is closed. Thus, when the brake pedal 19 is depressed, oil from the master cylinder 101 is not supplied into the front brake device 100, but into the rear brake devices 22. In this case, the vehicle is put into the rear-brake mode wherein only the rear brake devices 22 are put into action.

Furthermore, the brake pedal 19 is linked with above-mentioned drive mode changing lever 130 through a linkage so as to make the drive mode changing lever 130 located at its 6-wheel-drive position when the brake pedal 19 is depressed.

The action of the above structure will be described. When the brake mode changing lever 155 is located at its rear-brake position Rb and the drive mode changing lever 130 is located at its 4-wheel-drive position 4WD, and when the brake pedal 19 is depressed, the manual valve 150 is closed and only the rear brake devices 22 are put into action. However, because the drive mode changing lever 130 is switched into its 6-wheel-drive position 6WD at the time when the brake pedal 19 is depressed and the clutch device 140 linked with the drive mode changing lever 130 is engaged, the braking force which the rear brake devices 22 apply onto the rear axles 8 and the middle axles 25 is also transmitted to the front axles 11 through the propeller shaft 18 and the like, thereby also braking the front axles 11.

Therefore, though the power from the engine 3 is transmitted to only the rear axles 8 and the middle axles 25 such that four wheels are driven, braking force generated by only rear brake devices 22 is applied onto not only the rear axles 8 and the middle axles 25 but also the front axles 11 such that all the six wheels can be braked.

In this structure, changing among 4-wheel-drive mode and 6-wheel-drive mode as the occasion arises is easy by engaging and disengaging the clutch device 140 by shifting the drive mode changing lever 130.

If the vehicle is put into the 4-wheel-drive mode and the brake pedal 19 is depressed in the rear-brake mode, braking force generated by the rear brake devices 22 is transmitted to the front axles 11 by the linkage between the brake pedal 19 and the clutch device 140. Though the front brake device 100 in the front transaxle device 10 is out of action, not only the rear wheels 9 and the middle wheels 26 but also the front wheels 12 are contributing to the braking of the vehicle. Thus, by putting the vehicle into the rear-brake mode, while good braking performance can be maintained, abrasion of the front brake device 100 can be prevented.

Of course, the vehicle can be put into the front-rear-brake mode which is effective when strong braking force is frequently desirable. In this mode, the front wheels 12 are braked by the front brake device 100 and the rear wheels 9 and the middle wheels 26 are braked by the rear brake devices 22. Good braking performance is achieved by applying braking force onto the rear wheels 9, the middle wheels 26, and the front wheels 12 (all six wheels), and the rear brake devices 22 are protected from overload, such that heating and abrasion can be minimized.

Although the invention has been described in its preferred form with a certain degree of particularity, it is understood that the present disclosure of the preferred form may be changed in the details of construction and the combination and arrangement of parts may be resorted without departing from the spirit and the scope of the invention as hereinafter claimed.

For example, the front transaxle device in the present invention can apply not only to a six-wheel-drive vehicle as described in above embodiment but also to a multi-wheel-drive vehicle wherein eight or more wheels are driven.

What is claimed is:

1. A multi-wheel-drive vehicle, comprising:

at least six wheels including a pair of front-most drive wheels;

a transmission including a first brake; and a front transaxle device, including:

a drive axle, said pair of front-most drive wheels being connected to said drive axle on opposite lateral sides of said front transaxle, an input shaft disposed perpendicularly to said drive axle so as to receive power from said transmission, a drive train drivingly connecting said input shaft to said drive axle, a clutch device located on said input shaft so as to selectively isolate said drive axle from rotation of said input shaft, wherein actuation of said first brake causes said clutch device to be engaged, and a second brake for braking said drive train.

2. The multi-wheel-drive vehicle as set forth in claim 1, said front transaxle device further comprising:

another drive axle; and a differential unit differentially connecting said drive axles to each other, said drive train being interposed between said input shaft and said differential unit.

3. The multi-wheel-drive vehicle as set forth in claim 1, wherein said second brake is applied when said first brake is applied.

4. The multi-wheel-drive vehicle as set forth in claim 3, said front transaxle device further comprising:

another drive axle; and a differential unit differentially connecting said drive axles to each other, said drive train being interposed between said input shaft and said differential unit.

* * * * *